US009951185B2

(12) United States Patent
Huggins et al.

(10) Patent No.: US 9,951,185 B2
(45) Date of Patent: Apr. 24, 2018

(54) AMINOSILOXANES OF HIGH PURITY

(71) Applicant: Momentive Performance Materials GmbH, Leverkusen (DE)

(72) Inventors: John M. Huggins, Leverkusen (DE); Hurbertus Eversheim, Wermelskirchen (DE); Gunnar Hoffmüller, Odenthal/Neschen (DE)

(73) Assignee: Momentive Performance Materials Inc., Waterford, NY (US)

( * ) Notice: Subject to any disclaimer, the term of this patent is extended or adjusted under 35 U.S.C. 154(b) by 37 days.

(21) Appl. No.: 14/978,804

(22) Filed: Dec. 22, 2015

(65) Prior Publication Data

US 2016/0177037 A1 Jun. 23, 2016

Related U.S. Application Data

(60) Provisional application No. 62/096,103, filed on Dec. 23, 2014.

(51) Int. Cl.
| | |
|---|---|
| *C08G 77/26* | (2006.01) |
| *C08G 77/06* | (2006.01) |
| *C08G 77/10* | (2006.01) |
| *C08G 77/455* | (2006.01) |
| *C08G 77/34* | (2006.01) |
| *C08G 77/36* | (2006.01) |
| *C08G 77/38* | (2006.01) |
| *C08G 77/458* | (2006.01) |
| *C08L 83/10* | (2006.01) |

(52) U.S. Cl.
CPC ............. *C08G 77/26* (2013.01); *C08G 77/06* (2013.01); *C08G 77/10* (2013.01); *C08G 77/34* (2013.01); *C08G 77/36* (2013.01); *C08G 77/38* (2013.01); *C08G 77/455* (2013.01); *C08G 77/458* (2013.01); *C08L 83/10* (2013.01)

(58) Field of Classification Search
CPC ...................................................... C08G 77/26
USPC ........................................................ 528/38
See application file for complete search history.

(56) References Cited

U.S. PATENT DOCUMENTS

| | | | |
|---|---|---|---|
| 2,185,983 A | 1/1940 | Humphner | |
| 2,823,218 A | 1/1958 | Speier et al. | |
| 2,998,406 A | * 8/1961 | Bailey | C07F 7/0834 528/33 |
| 3,159,662 A | 12/1964 | Ashby | |
| 3,220,972 A | 11/1965 | Lamoreaux | |
| 3,325,450 A | 6/1967 | Holub | |
| 3,497,485 A | 2/1970 | Emmons | |
| 3,522,327 A | 7/1970 | Parasko | |
| 3,715,334 A | 2/1973 | Karstedt | |
| 3,715,452 A | 2/1973 | Long | |
| 4,288,345 A | 9/1981 | Ashby et al. | |
| 4,395,527 A | 7/1983 | Berger | |
| 4,584,393 A | 4/1986 | Webb et al. | |
| 4,586,997 A | 5/1986 | Lee | |
| 4,649,208 A | 3/1987 | Zenbayashi et al. | |
| 4,670,497 A | 6/1987 | Lee | |
| 5,026,890 A | 6/1991 | Webb et al. | |
| 5,486,634 A | * 1/1996 | Hahn | C08G 77/045 556/425 |
| 5,861,085 A | * 1/1999 | Ohtaki | C07F 7/20 203/48 |
| 5,892,084 A | 4/1999 | Janeiro et al. | |
| 6,177,583 B1 | 1/2001 | Marzinke et al. | |
| 7,202,320 B2 | 4/2007 | George et al. | |

FOREIGN PATENT DOCUMENTS

| | | |
|---|---|---|
| GB | 2 185 984 A | 8/1987 |
| JP | 2002194086 | 7/2002 |

OTHER PUBLICATIONS

T.C. Kendrick et al., "Siloxane polymers and copolymers", The Chemistry of Organic Silicon Compounds, John Wiley & Sons, Ltd., NY, 1989, pp. 1289-1361.
A.R. Gilbert et al., "Transient Catalysts for the Polymerization of Organosiloxanes", Journal of Polymer Science, (1959) vol. XL, pp. 35-58.
International Search Report and Written Opinion from PCT/EP2015/080994 dated Feb. 26, 2016.
"Tetramethylammonium 3-Aminopropyl Dimethylsilanolate—A New Catalyst for the Synthesis of High Purity, High Molecular Weight α,ω-bis (Aminopropyl) Polydimethylsiloxanes", Polymer International 24: (1991) 131-138.

* cited by examiner

*Primary Examiner* — Margaret Moore
(74) *Attorney, Agent, or Firm* — James C. Abruzzo

(57) ABSTRACT

Disclosed herein is a composition comprising amino-functional polysiloxanes of high purity and their preparation. Also disclosed herein is an aminoalkyl-functional polysiloxane, a process for purifying this aminoalkyl-functional polysiloxane, a process for preparing the composition, a use of the composition, a polyorganosiloxane-polyorgano block copolymer, a process for the preparation of a polyorganosiloxane-polyorgano block copolymer and a shaped, formed and/or extruded shaped article.

9 Claims, No Drawings

AMINOSILOXANES OF HIGH PURITY

This application claims priority to Provisional U.S. Patent Application No. 62/096,103, dated Dec. 23, 2014, the entire contents of which are incorporated herein by reference in their entirety.

FIELD OF INVENTION

The present invention relates to a composition comprising amino-functional polysiloxanes of high purity and their preparation. The present invention is also concerned with an aminoalkyl-functional polysiloxane, a process for purifying this aminoalkyl-functional polysiloxane, a process for preparing the composition, a use of the composition, a polyorganosiloxane-polyorgano block copolymer, a process for the preparation of a polyorganosiloxane-polyorgano block copolymer and a shaped, formed and/or extruded shaped article.

BACKGROUND OF THE INVENTION

Amino-functional polysiloxanes are generally known. Commonly the aminoalkyl functional groups are attached to the silicon atom in a terminal position, and comprise the structure of general formula (I).

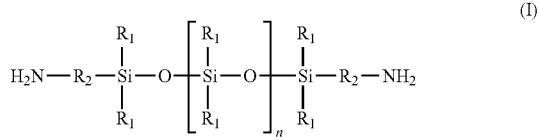
(I)

Amino-functional polysiloxanes are commonly prepared by the platinum catalyzed hydrosilylation of allyl amine to a hydridosiloxane such as described in U.S. Pat. No. 5,026,890, U.S. Pat. No. 4,649,208, U.S. Pat. No. 5,892,084 and U.S. Pat. No. 6,177,583. In these processes, the aminopropylpolysiloxanes are often obtained with highly colored impurities. These impurities can include, among others, iminoalkyl functional groups of the general formula (IV).

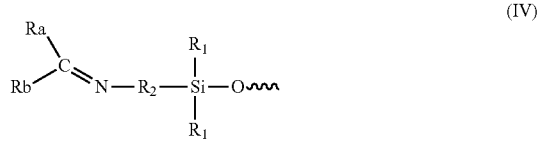
(IV)

wherein $R_a$ is commonly hydrogen and $R_b$ is commonly a C2-C5, optionally branched and/or unsaturated alkyl group (cf. comparative examples 4 and 5 below), and wherein each $R_1$ group is independently selected from the group consisting of a monovalent C1-C20 alkyl, arylalkyl, alkylaryl, and aryl group, each of them being linear or branched, each $R_2$ group is independently selected from the group consisting of linear or branched divalent optionally substituted organic radicals with 3 to 7 carbon atoms which can be interrupted by —O—, —NH—. The impurities of the general formula (IV) are commonly observed as uncontrolled byproducts of the hydrosilylation reaction with platinum at a level of about 2-about 10 mole-% of the total aminoalkyl-groups in the polymer. The impurities of the general formula (IV) are identified by signals in the proton NMR in the range of 7.4 to 7.7 ppm, and/or near 5.7, 3.31, 2.22, 1.8 and 1.50 ppm, among others. Moreover, there are also other byproducts in the above-mentioned process. For example, undesirable highly colored impurities are commonly identified by signals in the proton NMR in the range of 3.1 to 3.4 and near 4.0 ppm, among others.

These iminoalkyl impurities are detrimental in applications of these materials. In particular, linear aminopropyl polysiloxanes of formula (I) are employed to make linear polysiloxane-polyimide and polysiloxane-polyetherimide block copolymers.

U.S. Pat. No. 3,325,450 describes a process for making polysiloxane-polyimide block copolymers by reaction of aminopropyl-functional polysiloxanes of the general formula (I) and organic dianhydrides.

U.S. Pat. No. 4,586,997 describes a process for making polysiloxane-polyetherimide block copolymers by reaction of aminopropyl-functional polysiloxanes of the general formula (I) and organic bis(etheranhydrides) and organic diamines.

The iminoalkyl impurities of the general formula (IV) in these aminopropyl-functional polysiloxanes are unreactive in the synthesis of these block copolymer materials, and thus are undesirable chain-terminating groups, that lead to reduced block copolymer formation and poor control of molecular weight. Without wishing to be bound by theory, it is believed that the colored impurities include secondary amino-functional siloxanes that also function as undesirable chain-terminating groups in block copolymer synthesis. Likewise highly colored impurities lead to undesirable increased color in the resultant block copolymers.

Using the state-of-the art as described in '890, '208, '084 and '583 inevitably leads to impurities of the general formula (IV) (e. g. comparative examples 4 and 5 below). There is no known technology for avoiding these byproducts in the direct reactions of allyl amine with hydridosiloxanes under platinum catalysis.

Alternatively, it has been proposed to avoid the formation of impurities of the general formula (IV) by first protecting the primary amino function in allyl amine, then performing the hydrosilylation with the hydridosiloxane and platinum, followed then by deprotection of the amino function to give the final amino-functional polysiloxanes.

U.S. Pat. No. 4,584,393 describes the reaction of allyl amine with trimethylchlorosilane followed by purification by distillation to give the silazane

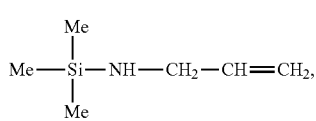

then reaction of this silazane with hydridosiloxanes under platinum catalysis and finally hydrolysis of the silazane group to form aminopropyl-functional polysiloxanes of formula (I). This process gives products that are, as a rule, highly colored.

GB Patent No. 2,185,984 describes formation of ketimines of allyl amine with simple ketones such as methylethylketone or cyclohexanone first, followed after by neutralization of the acid catalyst used by purification of the ketamine by distillation. This ketimine is then reacted under platinum catalysis with a hydridosiloxane. Finally, the ketimine group is removed by acid catalyzed hydrolysis. The acid catalyst used to remove the ketimine group is preferably acid activated clay.

The methods according to '393 and '984 have the disadvantage of employing reactions of the highly toxic allyl amine to produce intermediates requiring purification. This adds cost and unnecessary handling of toxic intermediates and byproducts. In addition, these methods do not provide for the removal of colored impurities that can form during hydrosilylation and subsequent manipulations.

SUMMARY OF THE INVENTION

Accordingly, it was an object of the present invention to overcome at least one, preferably all of the disadvantages known in the prior art. Especially, it was an object of the present invention to provide a cost-effective process to produce amino-functional polysiloxanes of low color and free of impurities, preferably free of iminoalkyl impurities. The present invention provides an answer to that need. These objects have been solved by the composition, the aminoalkyl-functional polysiloxane, the process for purifying, the process for preparing the composition, the use, the polyorganosiloxane-polyorgano block copolymer, the process for the preparation of a polyorganosiloxane-polyorgano block copolymer and the shaped, formed and/or extruded shaped article of the present invention as set forth below.

Accordingly, the present invention provides a composition comprising, or in another embodiment, consisting essentially of, or, in another embodiment, consisting of
(A) at least one aminoalkyl-functional polysiloxane of general formula (I),

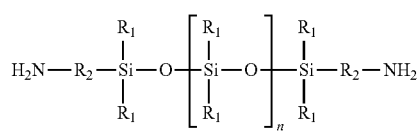

(I)

wherein each $R_1$ group is independently selected from the group consisting of a monovalent C1-C20 alkyl, arylalkyl, alkylaryl, and aryl group, each of them being linear or branched, each $R_2$ group is independently selected from the group consisting of linear or branched divalent optionally substituted organic radicals with 3 to 7 carbon atoms which can be interrupted by —O—, —NH, and n (here and in the following) is an integer and having a value of 0 to 2000,
(B) at least one compound which differs from (A) and is obtained by the hydrosilylation of at least one olefinic amine and at least one hydridosiloxane in the presence of a platinum catalyst, and
(C) optionally at least one compound which differs from (A) and (B) and does not contain any $NH_2$-functionality, characterized in that the $NH_2$-functionality of the sum of components (A) and (B) is in the range of 1.96 to <2.00.

Accordingly, the composition of the present invention is a substantially pure aminoalkyl-functional polysiloxane of general formula (I). The present invention provides compositions comprising linear amino-functional polysiloxanes of controlled structure and of high purity, which are particularly useful in processes to make polysiloxane-polyorgano block copolymers. Surprisingly, it was found that iminoalkyl impurities common in the hydrosilylation products of allyl amine with hydridosiloxanes can be effectively removed by hydrolysis with stoichiometric excesses of strong acids and stripping at elevated temperatures and reduced pressure of the resultant acid salt of the aminosiloxane. Use of catalytic amounts of acid, as described in GB Patent No. 2,185,984, failed to remove significant portions of the iminoalkyl impurities. Moreover, the hydrolysis is even more successful using effective stripping. It was also surprising that aminoalkyl-functional siloxanes free of color could be obtained by distillative cracking of the neutralized hydrolysis product under conditions of basic catalysis. The resultant distilled aminoalkyl-functional siloxanes are essentially colorless and iminoalkyl-free and can be used to make polysiloxanes of the general formula (I) by base catalyzed rearrangement. It was particularly surprising to find that when using the process of the present invention the iminoalkyl-free aminofunctional siloxanes are recovered in high yield and virtually all colored impurities remain in the distillation bottoms. Accordingly, the rearrangement of the aminoalkyl-functional polysiloxanes of the present invention can be effectively controlled. This leads to aminoalkyl functional polysiloxanes of controlled structures.

As used herein, the term "polysiloxane" encompasses oligomers and polymers comprising at least a disiloxane unit (—Si—O—Si—; n=0 in formula (I)). The term hydridosiloxanes, used herein, refers to polydialkylsiloxanes with terminal H—Si functional groups.

The composition of the present invention is characterized in that it has a $NH_2$-functionality of the sum of components (A), and (B), which is in the range of 1.96 to <2.00. Preferably, this $NH_2$-functionality is in the range of 1.9600 to 1.9999 and more preferably in the range of 1.980 to 1.999. Most preferably the $NH_2$-functionality is in the range of 1.9860 to 1.9990. The $NH_2$-functionality represents the number of $NH_2$-groups per molecule which is present in components (A) and (B) of the composition of the present invention. Basically, the $NH_2$-groups of component (A) contribute to this $NH_2$-functionality of the molecules of the present invention. However, component (B) does not necessarily comprise a $NH_2$-functionality, thus lowering the overall $NH_2$-functionality of the present composition. Moreover, component (C) which is optional in the composition of the present invention does not comprise any $NH_2$-functionality, thus does not contribute to the $NH_2$-functionality.

A pure siloxane according to Formula (I) has a $NH_2$-functionality of 2.0. Impurities corresponding to component B (commonly but not only iminoalkyl functional groups) in the inventive composition reduce the observed $NH_2$-functionality to a value of less than 2.0. Methods for determining the $NH_2$-functionality are known to the person skilled in the art. Preferably, the $NH_2$-functionality is determined using $^1$H-NMR spectroscopy, IR-spectroscopy or by titration using perchloric acid in glacial acetic acid. Those techniques are, for example, described in J. Jiang, M. J. MacLachlan, Cationic Guest Inclusion in Widemouthed Schiff Base Macrocycles, Chem. Commun. 2009, 5695-5697, G. Wang, G. Jiang, J. Zhang, Preparation, curing kinetic and properties of a novel amine with flexible polyoxypropylene side chain curing agent for epoxy resin, Thermochimic Acta, 589 (2014) 197-206, Anal. Chim. Acta. 31 (1964), 294-296 or U.S. Pat. No. 3,497,485. Preferably, the $NH_2$-functionality is determined using $^1$H-NMR spectroscopy.

The $NH_2$-functionality of the sum of components (A), and (B) is calculated from the mol-% impurity-CH functionality as determined by $^1$H-NMR according to the formula:

$$[NH_2\text{-functionality}]=2.0*(1-[\text{mol-\% impurity-CH}]/100)$$

whereby, the mol percent impurity-CH functionality can be calculated from the corresponding area integrals of the impurity (N=C$\underline{H}$)-signals of the iminoalkyl groups, observed in the range of 7.4-7.7 ppm vs the integrals of the SiC$\underline{H}_n$ multiplet signals for the Si—R$_2$ group, whereby n can be either 1 or 2, that are observed in the range of 0.4 to 0.7 ppm in the $^1$H-NMR spectrum in CDCl$_3$ solvent of the composition. The skilled person is able to identify the respective signals of any H in the R$_2$ group and thus can calculate the respective NH$_2$-functionality. Preferably, the composition comprises R$_2$ being a C3 alkyl group. There are two possible structures for R$_2$ being next to the amino functionality: Si—CH$_2$CH$_2$CH$_2$—NH$_2$ and Si—CH(CH$_3$)—CH$_2$—NH$_2$, whereby the SiC$\underline{H}_2$— and SiC$\underline{H}$ signals are observed at 0.46 ppm and 0.67 ppm, respectively. The corresponding formula for calculating the mol percent impurity-CH where R$_2$ is a C3 alkyl group is thus:

[mol-% impurity-CH]=100*[Int(7.4–7.7 ppm)]/{[Int (0.46 ppm)]/2+[Int(0.67 ppm)]}

Most preferably, the NH$_2$-functionality is determined using a 500 MHz $^1$H-NMR spectrum of the composition of the present invention in CDCl$_3$, wherein the composition comprises R$_2$ being CH$_2$CH$_2$CH$_2$ and CH(CH$_3$)—CH$_2$. The signal at 7.4 to 7.7 ppm referring to the impurity is integrated using the limits exactly set to 7.4 to 7.7 ppm. Moreover, the peak at 0.46 ppm is integrated using limits exactly set to 0.3 to 0.6 ppm and the integral is set to 1.0000. Finally, the peak at 0.67 ppm is integrated using the limits exactly set to 0.6 to 0.75 ppm. The mol-% impurity-CH is calculated using the above-shown formula, the result of which is then used to determine the NH$_2$-functionality using the above-shown formula.

The composition of the present invention comprising, or in another embodiment, consists essentially of, and, in another embodiment, consists of component (A), (B) and optionally (C). In a preferred embodiment, the composition of the present invention essentially consists of component (A), (B) and optionally (C). The terms "essentially consists of" or "consisting essentially of" here and in the entire application intends to mean that the composition apart from the components (A), (B) and (C) may contain further components as long as they do not affect or are detrimental to the ability of the composition of the invention to be used in a process for the preparation of a polyorganosiloxane-polyorgano block copolymer.

In one embodiment, the composition of the present invention does not comprise any compound (C). In another embodiment the composition of the present invention comprises compound (C). In the latter embodiment component (C) preferably is present in an amount of less than 20 weight percent, more preferably of less than 15 weight percent, still more preferably of less than 10 weight percent based on the sum of the amounts of components (A) and (B). Furthermore, component (C) is preferably present in an amount of less than 20 weight percent, more preferably less than 15 weight percent, still more preferably of less than 10 weight percent based on the total weight of the entire composition.

If component (C) is present in the composition of the present invention, it does not have any NH$_2$-functionality. As component (C) differs from (A) and (B), component (C) does also not comprise the impurities with iminoalkyl functional groups of the general formula (IV):

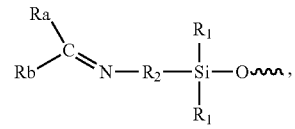
(IV)

wherein R$_a$, R$_b$, R$_1$ and R$_2$ are as defined above, resulting in particular from hydrosilylation. Preferably component (C) does not contain any nitrogen-functionality. Furthermore, preferably, component (C) is any, preferably organic, compound which is inert when used in a polymerization reaction of the compound (A) and optionally compound (B) with organic monomers to form polyorganosiloxane-polyorgano block copolymers. Preferably, the expression "inert" in this context means that the compound does not react with the organic monomers of the polymerization reaction and thus, preferably is not incorporated into the backbone of the block copolymer itself which is built due to the reaction. Component (C) preferably does not undesirably lead to chain-terminating in the polyorganosiloxane-polyorgano block copolymer formation reaction, leading to reduced block copolymer formation and poor control of molecular weight, and does not lead to undesirable increased color in the resultant block copolymers. Most preferably, component (C) is miscible with components (A) and (B). Especially preferred is component (C) consisting of at least one non-functional polysiloxane or a polar or nonpolar organic compound. Examples of the optional component (C) include non-functional polysiloxanes, i.e. that do not have functional groups, such as cyclic or linear polydialkylsiloxanes, such as octamethylcyclotetrasiloxane, decamethylcyclopentasiloxane, dodecamethylcycloheptasiloxane or hexamethyldisiloxane, or organic compounds, such as heptane, cyclohexane, toluene, xylenes, dibutylethanolamine, trimethylamine, triethylamine, tributylamine, ethanol, isopropylalcohol, benzylalcohol, oleoyl alcohol, diethyl ether, dibutylether, dioxane, tetrahydrofuran, or the like.

Preferably, the terminal Si atoms of formula (I) are independently bound to a carbon atom of a R$_2$ group that has at least one hydrogen substituent.

In a preferred embodiment, n is 0 to 200. More preferably n is 0 to 100. Still more preferably, R$_1$ represents methyl and/or R$_2$ represents linear or branched divalent radicals with 3 carbon atoms. Even still more preferably, n is 0 to 200, and R$_1$ represents methyl and R$_2$ represents linear or branched divalent organic radicals with 3 carbon atoms and the olefinic amine is allyl amine.

Preferably, the R$_1$ groups are independently monovalent methyl or phenyl groups. More preferably, the R$_1$ groups are methyl. Preferably the R$_2$ groups are linear or branched divalent C3 or C4 alkyl groups. More preferably, the R$_2$ groups are linear or branched divalent C3 groups. Moreover, it is preferred that R$_2$ comprises at least one hydrogen atom. Even more preferably, R$_2$ is —CH$_2$CH$_2$CH$_2$— or —CH(CH$_3$)CH$_2$—.

In one embodiment, it is preferred that n in Formula (I) is 0 to 7. In another embodiment, it is preferred that n in Formula (I) is 6 to 2000.

Component (B) is at least one compound which differs from (A) and is obtained by the hydrosilylation of at least one olefinic amine and at least one hydridosiloxane in the presence of a platinum catalyst. This component (B) preferably comprises at least one byproduct of the commonly known hydrosilylation reaction between at least one olefinic amine and at least one hydridosiloxane. The principle product of this reaction is component (A). The olefinic amine used in this hydrosilylation reaction bears an amino functionality that is free. This means that the at least one olefinic amine is not protected with any protection group.

Preferably, the at least one olefinic amine has the general structure (II)

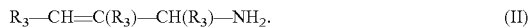

$R_3$—CH=C($R_3$)—CH($R_3$)—$NH_2$. (II)

wherein each $R_3$ is independently selected from the group consisting of hydrogen and a monovalent C1-C4 alkyl group. Examples of the preferred olefinic amines include allyl amine, 2-methylallyl amine, or 2-butenylamine. More preferably, the at least one olefinic amine is allyl amine.

Preferably, component (B) is obtained from any of the hydrosilylation reactions as described in U.S. Pat. No. 5,026,890, U.S. Pat. No. 4,649,208, U.S. Pat. No. 5,892,084 and U.S. Pat. No. 6,177,583. Each of these documents is incorporated herein by reference with respect to the hydrosilylation reaction conditions which can be used in order to obtain component (B). Also preferably any of the platinum hydrosilylation catalysts can be employed as described in U.S. Pat. No. 2,823,218, U.S. Pat. No. 3,159,662, U.S. Pat. No. 3,159,662, U.S. Pat. No. 3,220,972, U.S. Pat. No. 3,522,327, U.S. Pat. No. 3,715,334, U.S. Pat. No. 3,715,452, U.S. Pat. No. 4,288,345, and U.S. Pat. No. 7,202,320, which are each incorporated by reference in their entirety herein. Preferably, component (B) comprises at least one iminoalkyl functionality. More preferably, component (B) comprises at least one compound bearing at least one structure of formula (IV). Still preferably, component (B) comprises at least one colored byproduct that may be formed from siloxanes of general formula (I) or polysiloxanes with at least one iminoalkyl functionality by oxidation. Equally preferred, component (B) comprises at least one colored byproduct that is formed by reaction of siloxanes of general formula (I) or polysiloxanes with at least one iminoalkyl functionality with acids. Where reference is made to an "impurity" or "impure aminoalkyl-functional polysiloxane" herein, the impurity which is referred to is component (B). Preferably, in the composition of the present invention component (B) is present in an amount of >0 to about 4 weight percent, based on the total weight of the sum of components (A) and (B). Still preferably, in the composition of the present invention component (B) is present in an amount of >0 to about 2 mol percent, more preferably, >0 to about 1 mol percent and most preferably, >0 to about 0.5 mol percent based on the sum of components (A) and (B). In the composition of the present invention component (B) can be present in an amount of >0.0001 weight percent or >0.001 weight percent or >0.01 weight percent, based on the total weight of the sum of components (A) and (B).

Still preferably, the composition of the present invention is characterized in that component (B) comprises at least one compound comprising at least one iminoalkyl functionality and this at least one compound comprising at least one iminoalkyl functionality is present in an amount of >0 to about 4 weight percent, based on the total weight of the sum of components (A) and (B). Still preferably, the composition of the present invention is characterized in that component (B) comprises at least one compound comprising at least one iminoalkyl functionality and this at least one compound comprising at least one iminoalkyl functionality is present in an amount of >0 to about 2 mol percent, more preferably, >0 to about 1 mol percent and most preferably, >0 to about 0.5 mol percent based on the sum of components (A) and (B). In the composition of the present invention the at least one compound comprising at least one iminoalkyl functionality can be present in an amount of >0.0001 weight percent or >0.001 weight percent or >0.01 weight percent, based on the total weight of the sum of components (A) and (B).

Preferably, the content of component (B) is determined, wherein this component (B) comprises at least one iminoalkyl functionality, by examination of the IR spectrum and analysis of the absorption peak at about 1671 $cm^{-1}$ which is characteristic for iminoalkyl functions.

In a preferred embodiment of the present invention, the composition of the present invention has a color according to Hazen in the range of <100, i.e. 0 to 100. This range is preferably used when referring to the expression "free of color" or "essentially colorless" used herein. The determination of the color according to Hazen is known to the person skilled in the art and is preferably determined according to ASTM D1209.

In another aspect of the present invention an amino-functional polysiloxane of general formula (I) is provided, wherein the polysiloxane is essentially free of color, i.e., showing a Hazen Number below 100 and has a $NH_2$-functionality of >1.96,

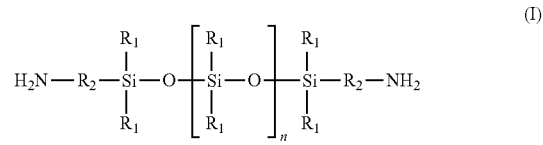

(I)

wherein $R_1$, $R_2$ are those as defined above, and n is an integer of 0 to 7, wherein the polysiloxane is made by a process comprising the steps of:

i) reacting an aminoalkyl-functional polysiloxane having a $NH_2$-functionality >0 (like for example >1.5 or >1.6 or >1.7 or >1.8) and <1.96 and/or color according to Hazen number of >100 with an excess, related to the $NH_2$ group, of an acid with a pKa ≤5.5 and an excess of water (The excess of water relates to the moles of water relative to the moles of acid used. Preferably at least 3 moles of water per mole of acid is used. Most preferred is the use of a large excess of water, such as at least 10 moles of water per mole of acid.), to provide for a protonated aminoalkyl-functional polysiloxane, ii) removing the volatile compounds present in the product of step i) by distillation, optionally with the use of an inert carrier gas, at temperatures of about 40 to about 250° C. at about 0.1 to about 1030 mbar, to provide for a devolatilized higher boiling product protonated aminoalkyl-functional polysiloxane, iii) neutralizing the resulting devolatilized higher boiling product of step ii) with at least one base, to provide for a high boiling aminoalkyl-functional polysiloxane, and iv) depolymerizing the high boiling aminoalkyl-functional polysiloxane product of step iii) in the presence of at least one base and isolating the product by distillation at temperatures of about 60° C. to about 250° C. at about 0.1 to about 1030 mbar, to provide an amino-functional polysiloxane of formula (I).

In another aspect of the present invention, a process for purifying an aminoalkyl-functional polysiloxane of general formula (I) is provided

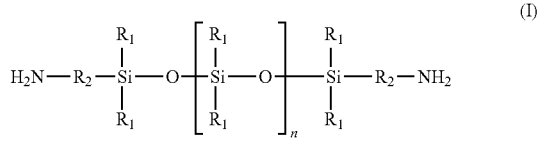

(I)

wherein $R_1$, $R_2$ are those as defined above, and n is an integer 0 to 7, the process comprising the steps of:

i) reacting a composition comprising (A) at least one aminoalkyl-functional polysiloxane of general formula (I), and (B) at least one compound which differs from (A) and is obtained by the hydrosilylation of at least one olefinic amine and at least one hydridosiloxane in the presence of a platinum catalyst, wherein the $NH_2$-functionality of the composition is >0 (like for example >1.5 or >1.6 or >1.7 or >1.8), but <1.96, with a stoichiometric excess of at least one acid having a pKa ≤5.5 and an excess of water (The excess of water relates to the moles of water relative to the moles of acid used. Preferably at least 3 moles of water per mole of acid is used. Most preferred is the use of a large excess of water, such as at least 10 moles of water per mole of acid.), the stoichiometric excess acid referring to the $NH_2$-functionality of the composition comprising (A) and (B), ii) removing the volatile compounds present in the product of step i) by distillation, optionally with the use of an inert carrier gas, at temperatures of about 40 to about 250° C. at about 0.1 to about 1030 mbar, iii) neutralizing the resulting devolatilized higher boiling product of step ii) with at least one base, and iv) depolymerizing the product of step iii) in the presence of at least one base and isolating the product by distillation at temperatures of about 60° C. to about 250° C. at about 0.1 to about 1030 mbar.

Preferably, step i) according to the present invention is performed at a temperature range of from about 15 to about 45° C. Preferably, step ii) is conducted at about 0.2 to about 1030 mbar. Still preferably, step iv) of the present invention is conducted at about 0.2 to about 1030 mbar.

According to the present invention the term "neutralizing" or "neutralization", as for example used with respect to step iii) preferably refers to neutralization of the acid used in step (i) and resulting in formation of free aminoalkyl groups.

According to the present invention the term "process for purifying" preferably relates to a process, wherein at least one component (B) is removed from the initial composition comprising (A) and (B). Thereby, the purity of the resulting composition is improved with respect to component (A). Preferably, this purity is indicated by the $NH_2$-functionality of the composition. The higher the purity of the composition, i. e. the concentration of component (A) in the composition, the higher is the $NH_2$-functionality of the composition. Most preferably, composition (A) and (B) which is applied in step i) of the process for purifying is the direct product of the hydrosilylation reaction of at least one olefinic amine and at least one hydridosiloxane in the presence of a platinum catalyst. "Direct" preferably means that no further purification. i. e. increase of component (A) in the resulting composition has been carried out before the process for purification of the present invention is carried out. This means, that common process steps such as removal of a solvent, treatment with adsorbents and/or filtration in order to remove the catalyst etc. can be carried out; however, the product is still the direct product of the hydrosilylation reaction. Conducting those steps may lead to an increase of component (A) in the composition; however, this increase is unintentional and due to adhesion of component (B) to the adsorbent or filter material, etc.

More preferably, process step i) is carried out using the direct product of any of the hydrosilylation processes described above (i. e. known in the prior art). Preferably, this composition used in step i) has a color according to Hazen in the range of 100 to 500.

Preferably, components (A) and (B) are those as described in preferred embodiments above. More preferably, the composition of step i) further optionally comprises at least one compound (C) as defined above.

Preferably, the $NH_2$-functionality of the composition used in step i), i. e. of the sum of components (A) and (B), is in the range of 1 to less than 1.96, more preferably 1.5 to 1.96 and most preferably 1.80 to 1.94.

In another aspect, the present invention relates to a process for producing the amino-functional polydiorganosiloxanes of general formula (I), essentially free of color and essentially free of iminoalkyl-functional impurities comprising the above-mentioned steps i) to iv). According to the present invention, when referring to formula (I) being "free of iminoalkyl-functional impurities" or "iminoalkyl-free" preferably reference is made to the composition of the present invention having the defined $NH_2$-functionality. This means that preferably the composition (A), (B) and optionally (C) is essentially free of component (B) having at least one iminoalkyl-functionality.

In still another aspect of the present invention, an aminoalkyl-functional polysiloxane of general formula (I) is provided, wherein the polysiloxane is essentially free of color showing a Hazen Number <100 and has a $NH_2$-functionality of >1.96,

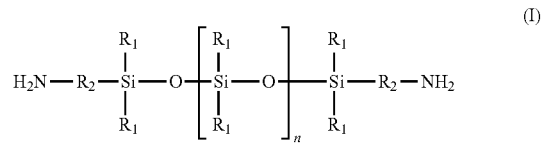

(I)

wherein $R_1$, $R_2$ are those as defined above, and n is an integer of 6 to 2000, wherein the polysiloxane is obtained by a process comprising the steps of:

v) reacting the aminoalkyl-functional polysiloxane of the present invention or the product of the process for purifying of the present invention with at least one basic catalyst, optionally with additional cyclopolydialkylsiloxanes at temperatures of about 60 to about 200° C. for time sufficient for rearrangement, vi) deactivating the at least one basic catalyst in the product of step v), and vii) optionally submitting the product of step vi) to a distillation step to remove at least one compound which has a boiling point at temperatures of about 60° C. to about 250° C. at 0.1 to 1030 mbar.

According to the present invention, the "time sufficient for rearrangement" in step v) can be determined by the person skilled in the art. Step v) refers to an equilibration reaction, or in the presence of cyclopolydialkylsiloxanes, a ring-opening equilibration reaction. Accordingly, preferably the "time sufficient for rearrangement" refers to a time which is required in order to increase the average of n of the educts used in step v) and achieve equilibrium. Preferably, equilibrium is achieved when the reaction mixture has achieved a steady state in which the average value of n does not change with further reaction time. Most preferably at equilibrium the sum of the cyclopolydialkylsiloxanes in the reaction mixture is less than about 15 weight percent based on the weight of the total reaction mixture.

In yet another aspect of the present invention a process for providing the composition of the present invention is provided, wherein n is an integer of 6 to 2000, said process comprising the steps v) to vii) as mentioned above.

In still another aspect, the present invention relates a process for producing amino-functional polysiloxanes of the general formula (I) essentially free of color and free of iminoalkyl impurities by rearrangement of the purified aminoalkyl-functional siloxanes obtained from the base catalyzed cracking step (iv), comprising the steps v) to vii) as mentioned above.

The inventive process step i) involves treatment of the impure aminoalkyl-functional polysiloxane/the composition comprising (A) and (B) with a stoichiometric excess, preferably an excess of 100 molar-% equivalent of an acid having a pKa ≤5.5 and an excess of water. According to the present invention a stoichiometric excess acid in this process step relates to the molar ratio of the H+ ions used to the —$NH_2$ groups present in the composition as being greater than 1.0. The excess of water relates to the moles of water relative to the moles of acid used. Preferably at least 3 moles of water per mole of acid is used. Most preferred is the use of a large excess of water, such as at least 10 moles of water per mole of acid. The inventive acid can be any acid capable of protonating the aminoalkyl-function. Preferred acids include acetic acid, hydrochloric acid and sulfuric acid, although other organic and inorganic acids can be used. Preferably, in an embodiment, in all aspects of the present invention the at least one acid of reaction step i) is hydrochloric acid. It is preferred to add the acid as an aqueous solution. Additional water and/or solvents can be added to help control the viscosity of the acid-treated aminoalkyl-functional siloxane. Preferred solvents include alcohols, such as isopropanol, isobutanol, or 2-methoxypropanol. The acid treatment is exothermic, thus applying cooling, in order to control the temperature of the reaction mixture to a range of 0 to about 60° C. is preferred. It is most preferred to control the reaction temperature to a range of about 10 to about 30° C.

The inventive process step ii) involves stripping the acid-treated siloxane of step i) at temperatures of about 40 to about 250° C. Although stripping at normal pressure is possible, use of reduced pressure is more effective and is preferred. It is preferred to strip the acid-treated siloxane at temperatures of at least about 50° C., more preferably about 55 to about 120° C., and at pressures of below about 25 mbars, more preferably below about 5 mbars. A nitrogen sparge can be used to help remove minor amounts of the hydrolysis byproducts. Without wishing to be bound by theory, it is believed that hydrolysis with stoichiometric amounts of at least one acid causes formation of free organic carbonyl byproducts, which are removed during the stripping step ii).

The inventive process step iii) involves neutralization of the resulting stripped siloxane with bases. In an embodiment, preferred is the use aqueous solutions of one or more inorganic bases such as sodium or potassium hydroxide, sodium or potassium bicarbonate, sodium or potassium carbonate, zinc oxide, magnesium oxide and sodium or potassium phosphates in water, although other bases may also be used. It is preferred to use an excess of such base. After neutralization the amino-functional siloxane may be optionally washed with water and the water phase decanted. This water wash can be repeated as necessary.

The inventive process step iv) involves the base catalyzed cracking and isolation of a purified aminoalkyl-functional polysiloxane mixture by distillation. The excess base used in the neutralization step iii) may be used as catalyst. It is preferred to add additional base catalyst after first washing the neutralized amino-functional siloxane with water and decanting the water phase to remove excess salts. Preferably, in an embodiment, in all aspects of the present invention the base catalyst in step iv) is sodium hydroxide, potassium hydroxide, cesium hydroxide or their related silanolates. Other bases may also be used. Preferably, basis with $p_{Ka}$>10 are used. Step iv) is performed at temperatures of from about 60 to about 250° C. It is preferred to apply reduced pressure to aid in recovery of the purified aminoalkyl-functional siloxane mixture by distillation. It is preferred to use temperatures of from about 70 to about 160° C. and pressures of less than about 10 mbars. More preferred are temperatures of about 80-about 130° C. and less than about 5 mbars pressure. Optionally, higher boiling organic compounds, such as high boiling alcohols, can be added to help fluidize the reaction bottoms. Preferred is the use of C18-C30 primary alcohols. The purified aminoalkyl-functional polysiloxane mixture is collected as the distillate in this step, the remaining impurities, in particular colored compounds, remain in the distillation bottoms. The purified aminoalkyl-functional polysiloxanes obtained in this process are obtained as a mixture of component (A) and component (B), wherein n in formula (I)=0-7, together with cyclopolydialkylsiloxanes, in particular if the initial impure amino-functional siloxane had a value (n) of greater than 3. In a preferred embodiment, the product of step iv) is a mixture of component (A) and component (B), wherein n=0-3, and cyclopolydialkylsiloxanes.

The inventive process step v) involves reaction of the purified aminoalkyl-functional polysiloxane mixture obtained in the step iv) with optionally additional cyclopolydialkylsiloxanes and basic catalysts. The purified aminoalkyl-functional polysiloxane mixture obtained in step iv), either as a pure fraction or together with optional additional cyclopolydialkylsiloxane, react with basic catalysts known in the art, causing rearrangement. These rearrangement reactions are commonly referred to as equilibration or ring-opening equilibration reactions. These equilibration reactions are described for example in T. C. Kendrick, B. Parbhoo, J. W. White in *The Chemistry of Organic Silicon Compounds*, Wiley, New York, 1989, pp 1289-1361, which is incorporated by reference herein. Preferably, in an embodiment, in all aspects of the present invention the base catalyst in step v) is potassium hydroxide or cesium hydroxide and or their related silanolates, or quaternary ammonium or phosphonium hydroxides or their related silanolates. Rearrangement is commonly performed at temperatures of about 70-about 160° C., whereas the catalysts tetraalkylammonium or tetraalkylphosphonium hydroxides are best used at about 70-about 100° C. Preferably, the rearrangement occurs in a neat mixture of the reactants and catalyst. However it is optional to add inert solvents such as xylenes, ethers such a 1,2-dimethoxypropane or dimethylsulfoxide. Preferred is the catalysis with potassium hydroxide. Also preferred is the catalysis with tetramethylammonium hydroxide or tetrabutylammonium hydroxides and their corresponding silanolates. Such silanolates are well known in the art and are commonly obtained from the reaction of the corresponding hydroxides with cyclopolydialkylsiloxanes. These catalysts are described, for example, in A. R Gilbert and S. W. Kantor *Journal of Polymer Science*, Vol. XL, 35-58 (1959), which is incorporated by reference in its entirety herein.

After completion of the rearrangement reaction step v), the catalyst is made inactive in the inventive process step vi). Potassium or cesium hydroxide are preferably neutralized with phosphoric acid and/or its esters, in particular, the corresponding siloxane esters. Tetraalkylammonium or tetraalkylphosphonium hydroxides and their related silanolates are made inactive by thermal degradation at high temperature, for example temperatures of about 120-about 160° C. Alternative basic catalysts and neutralization agents can also be used in steps v) and vi).

In the optional inventive process step vii) volatile siloxanes having a boiling point in the range of about 60° C. to about 250° C. at about 0.1 to about 1030 mbar, in particular excess cyclopolydialkylsiloxane, are removed from the rearranged aminoalkyl-functional polysiloxanes by stripping at elevated temperatures and reduced pressure. It is preferred to remove volatile siloxanes having a boiling point in the range of about 60° C. to about 150° C. at about 5 mbar. It is also preferred to use elevated temperatures, in particular, about 100-about 180° C. and about 0.1 to about 30 mbar, preferably between 0.1 to 5 mbar. Sparging with an inert gas may be used to aid in removal of the volatiles.

In another aspect of the present invention, the composition of the present invention or the aminoalkyl-functional polysiloxane of the present invention is used in a process for the manufacture of polyorganosiloxane-polyorgano block copolymers, wherein at least one of the copolymer blocks is selected from the group consisting of polyurethanes, polyimide and polyetherimide. According to the present invention, a polyorganosiloxane-polyorgano block copolymer preferably includes di-, tri- or tetrablockcopolymers.

In still another aspect of the present invention, a polyorganosiloxane-polyorgano block copolymer is provided comprising at least one block which is obtained by polymerization of the composition according to the present invention or the aminoalkyl-functional polysiloxane of the present invention.

Preferably, the polyorganosiloxane-polyorgano block copolymer of the present invention comprises at least one block segment selected from the group consisting of structures of the general formula:

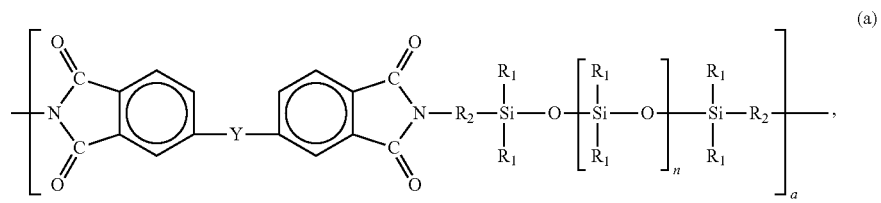

structures of the general formula,

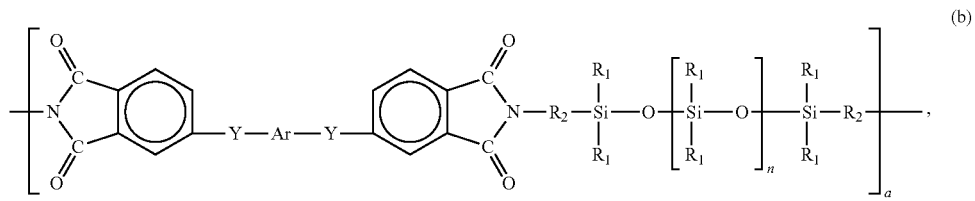

structures of the general formula,

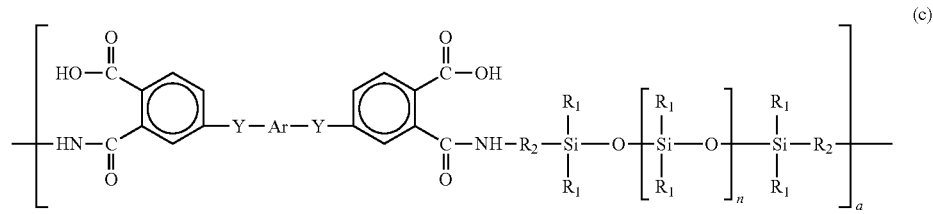

and any combination of these general structures,
wherein n=0 to 200, preferably n=6 to 100,
optionally combined with at least one structure selected from the group consisting of structures of the general formula,

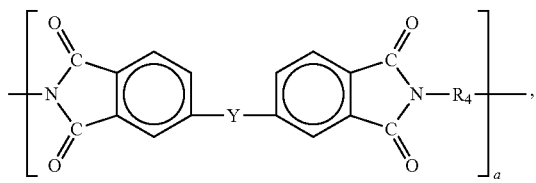
(d)

structures of the general formula,

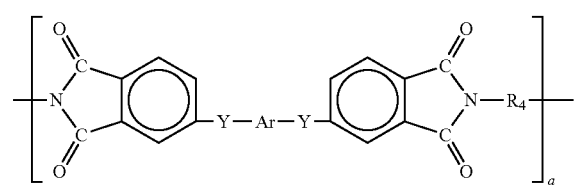
(e)

structures of the general formula,

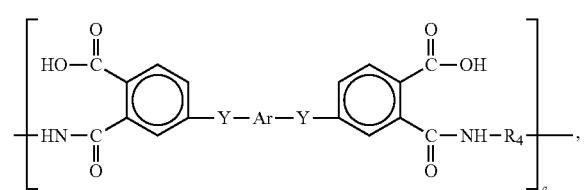
(f)

and any combination of these general structures,
wherein a is independently any number greater than or equal to 1,
$R_1$ and $R_2$ are as defined above,
$R_4$ is Ar or a linear or branched divalent C6-C20 aliphatic radical that can contain one or more groups selected from the group consisting of —O—, —S—, —SO$_2$—, or

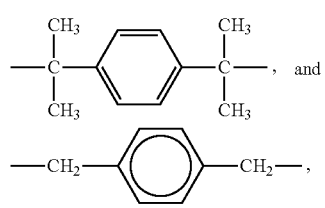

and
wherein Y is selected from the group consisting of a single bond, an oxygen atom, a carbonyl group, a sulphur atom, a SO$_2$ group, a divalent C1-C20 aliphatic radical, a divalent C5-C20 cycloaliphatic radical and combinations of the members of this group and, wherein Ar is selected from:

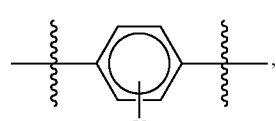
(g)

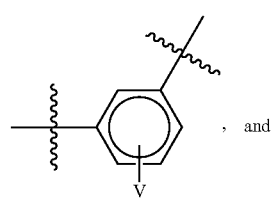
(h)
, and

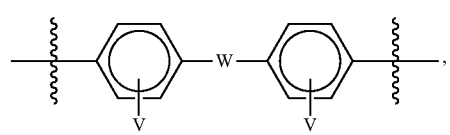
(i)

wherein
W is selected from the group consisting of a single bond, an oxygen atom, a carbonyl group, a sulphur atom, a SO$_2$ group, a divalent C1-C20 aliphatic radical, a divalent C5-C20 cycloaliphatic radical and combinations of the members of this group, and V represents at least one substituent group at the phenyl moieties which is independently selected from the group consisting of hydrogen, C1-C20 alkyl, C1-C20 alkoxy and halogen atoms.

In yet another aspect, the present invention relates to a process for the preparation of a polyorganosiloxane-polyorgano block copolymer, wherein the composition of the present invention or the aminoalkyl-functional polysiloxane of the present invention is reacted with one or more organic dianhydrides selected from the group consisting of the general structures

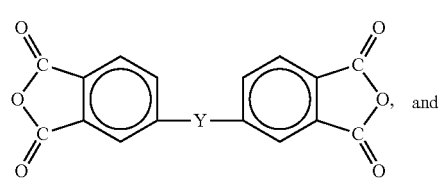
(j), and

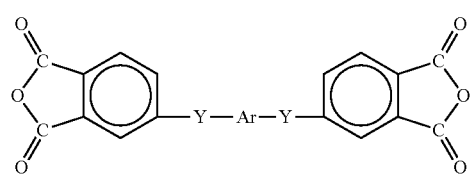
(k)

alone or together with one or more non-siloxane organic diamines of the general structure (III)

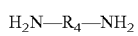
$H_2N—R_4—NH_2$ (III), wherein Y, Ar, are as defined above, and $R_4$ are as defined above. Particularly preferred examples of the inventive dianhydrides are

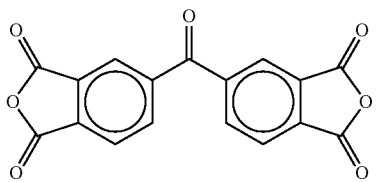
(l)

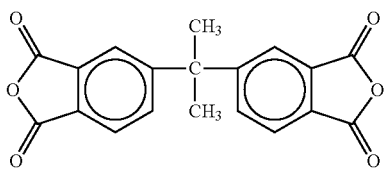
(m)

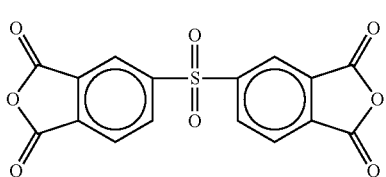
(n)

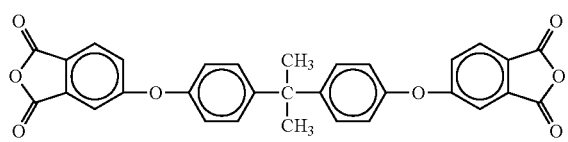
(o)

Particularly preferred examples of the inventive diamines are

(p)

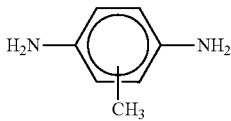
(q)

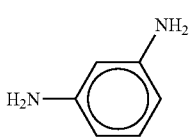
(r)

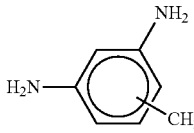
(s)

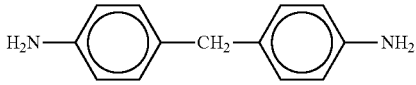
(t)

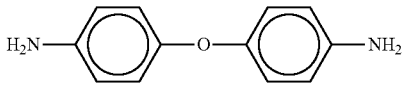
(u)

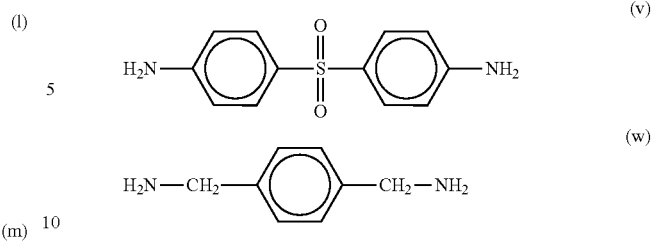

General methods for preparation of block copolymers of this kind are known in the art and described in U.S. Pat. No. 3,325,450, U.S. Pat. No. 4,586,997, U.S. Pat. No. 4,395,527 or U.S. Pat. No. 4,670,497.

In yet another aspect, the present invention relates to a shaped, formed and/or extruded article comprising the polyorganosiloxane-polyorgano block copolymer of the present invention.

Accordingly the present invention provides compositions comprising linear aminoalkyl-functional polysiloxanes of controlled structure and constitution and particularly low levels of unwanted colored impurities and iminoalkyl-functional impurities of the general formula (IV). The inventive amino-functional polysiloxanes are particularly useful in processes to make polysiloxane-polyorgano block copolymers with improved properties such as low color and controlled molecular weight. High levels of iminoalkyl impurities in polysiloxane-polyorgano block copolymers can also cause decreased stability under harsh conditions, such as high temperatures and high humidity, the inventive block copolymers are more stable under these conditions.

The following examples are intended to illustrate, but in no way limit the scope of the present invention. All percentages are by weight based on the total weight of the composition and all temperatures are in degrees Celsius unless explicitly stated otherwise. All patent applications, patents, and other publications cited herein are incorporated by reference in their entireties.

EXAMPLES

Unless explicitly stated differently, all percentages given are weight percentages. The given $NH_2$-functionalities were determined by $^1$H-NMR as described above. This means that a 500 MHz $^1$H-NMR spectrum of product in $CDCl_3$ was used. The signal at 7.4 to 7.7 ppm referring to the impurity was integrated using the limits exactly set to 7.4 to 7.7 ppm. Moreover, the peak at 0.46 ppm was integrated using limits exactly set to 0.3 to 0.6 ppm and the integral was set to 1.0000. Finally, the peak at 0.67 ppm was integrated using the limits exactly set to 0.6 to 0.75 ppm. The mol-% impurity-CH was calculated using the above-shown formula, the result of which was then used to determine the $NH_2$-functionality using the above-shown formula.

Example 1

250 g of a linear aminopropyl-functional polydimethylsiloxane with an amine content of 2.6 mmol$NH_2$/g (650 mmol $NH_2$), a Hazen color value of 146 and 2.5 mole-% of iminoalkyl groups and a $NH_2$-functionality of 1.95 based upon the total amine content and 40 g of water were charged to a 500 ml reactor equipped with a dropping funnel, a thermometer, condenser with distillation receiver. The dropping funnel was charged with 60 g of water and 72 g of 35% aqueous hydrochloric acid (681 mmol HCl, 105 mole-%)

and the whole apparatus was placed under a nitrogen atmosphere. The HCl/water solution was added to the reactor over 25 minutes at a temperature of below 30° C. Then 40 g of Dowanol PM was added and the reaction mixture was agitating for 1 hour. The product was stripped applying heat and vacuum until achieving 100° C. and 15 mbar and holding these conditions for 1 hour. The reactor was cooled to 55° C. Then 100 g water and 95 g of 40% potassium hydroxide solution were added. After agitation for 1 hour the two-phase mixture was allowed to settle and the lower phase was decanted. This neutralized siloxane was highly colored and essentially free of all iminopropyl groups.

To the neutralized siloxane was added 4 g of 40% potassium hydroxide solution and the reaction heat and vacuum were applied for fractional distillation. The distillation fraction obtained between 55 and 104° C. at 2-3 mbar was collected. This fraction consisted of 135 g of a colorless and essentially iminoalkyl-free mixture of aminopropylsiloxanes and cyclodimethylsiloxanes with an amino-content of 2.84 mmol $NH_2$/g (81.7 mole-% yield) and a $NH_2$-functionality of 1.99.

Example 2

To 118 g of the mixture of aminopropylsiloxanes and cyclodimethylsiloxanes from Example 1 and 52.5 g of additional octamethylcyclotetrasiloxane was added 3.4 g of tetramethylammonium siloxanoate with about a 2.8% tetramethylammonium content and the reaction was placed under a nitrogen atmosphere. The reaction mixture was heated to 80° C. for 8 hours with agitation. The catalyst was then deactivated by heating to 150° C. for 1 hour. Finally the reaction mixture was stripped of excess cyclosiloxanes to 140° C. and <1 mbar and filtered to obtain 148 g of a aminopropyl-functional polydimethylsiloxane with 1.94 mmol$NH_2$/g, a Hazen color value of 23, a viscosity of 14.6 mPa*s at 25° C., and according to $^1$H NMR an iminoalkyl content of 0.08 mole-% and a $NH_2$-functionality of 1.9984.

Example 3

250 g of a linear aminopropyl-functional polydimethylsiloxane with an amine content of 2.11 mmol$NH_2$/g, a Hazen color value of 413 and 7.5 mole-% of iminoalkyl groups and a $NH_2$-functionality of 1.85 was treated with acid as in Example 1 to yield after reaction with additional octamethylcyclotetrasiloxane as in Example 2 an amount of 196 g aminopropyl-functional polydimethylsiloxane with 2.04 mmol$NH_2$/g, a Hazen color value of 37, a viscosity of 14.3 mPa*s at 25° C., and an iminoalkyl content according to $^1$H NMR of 0.2 mole-% and a $NH_2$-functionality of 1.996.

As can be seen from the results of examples 1 to 3 an amino-functional polysiloxane can be obtained which has a higher purity than the respective educt. The iminoalkyl content in the educt has been significantly reduced using the process steps according to the present invention. Moreover, the products are essentially free of color. They can be obtained in a good yield.

Example 4 (Comparative Example)

168.7 g of a hydride terminated polydimethylsiloxane with a content of 2.47 mmol (SiH)/g and 31.3 g of allyl amine (0.55 mol) were charged to a 500 ml reactor equipped with a thermometer, condenser with distillation receiver and placed under an inert atmosphere. 1.2 g (60 ppm Pt) of a 1% solution in xylenes of the Pt(0) complex of tetravinyltetramethylcyclotetrasiloxane as described in U.S. Pat. No. 6,177,583 was added and the reaction was heated to 60° C. for 3 hours. A control sample determined that there was 100% conversion of the SiH groups. The reaction product was then stripped to 150° C. and <20 mbar, holding for 1 hour, cooled to ambient temperature and filtered over a Seitz K300 filter to yield 125 g of an aminopropyl-functional polydimethylsiloxane with a viscosity at 25° C. of 11.6 mPa*s, a Hazen color value of 454, an amine content of 2.03 mmol $NH_2$/g. According to $^1$H NMR the product had a content of 7.5 mole-% iminoalkyl groups and a $NH_2$-functionality of 1.85.

Example 5 (Comparative Example)

151.4 g of a hydride terminated polydimethylsiloxane with a content of 2.8 mmol (SiH)/g and 48.5 g of allyl amine (0.85 mol) were charged to a 500 ml reactor equipped with a thermometer, condenser with distillation receiver and placed under an inert atmosphere. 0.6 g (30 ppm Pt) of a 1% solution in xylenes of the Pt(0) complex of tetravinyltetramethylcyclotetrasiloxane as described in U.S. Pat. No. 6,177,583 was added and the reaction was heated to 60° C. and held at reflux 6 hours. During the reaction the temperature rose to 75° C. A control sample determined that there was 100% conversion of the SiH groups. The reaction product was then stripped to 150° C. and <20 mbar, holding for 1 hour, cooled to ambient temperature and filtered over a Seitz K300 filter to yield 163 g of an aminopropyl-functional polydimethylsiloxane with a viscosity at 25° C. of 10.7 mPa*s, a Hazen color value of 181, an amine content of 2.26 mmol $NH_2$/g. According to $^1$H NMR the product had a content of 6.3 mole-% iminoalkyl groups and a $NH_2$-functionality of 1.874.

Repeating these experiments under various reaction conditions, including the use of polar solvents, such as toluene or 2-methoxypropanol, and other catalysts such as the Pt(0) complex of divinyltetramethyldisiloxane also described in U.S. Pat. No. 6,177,583 or hexachloroplatinic acid or the platinum catalyst according to U.S. Pat. No. 3,220,972, or Pt$(NH_3)_2Cl_2$, always yielded products with at least 3.0 mole-% iminoalkyl groups or a $NH_2$-functionality of less than 1.94.

Example 6 (Comparative Example)

100 g of a linear aminopropyl-functional polydimethylsiloxane with an amine content of 2.14 mmol$NH_2$/g and 5.31 mole-% of iminoalkyl groups was treated with 40 g toluene, 40 g water and 2 g of acid activated clay (Tonsil CO 614G, Clariant) according to GB 2,185,984 to obtain an isolated aminosiloxane with a 5.15 mole-% iminoalkyl content and a $NH_2$-functionality of 1.897.

Example 7 (Comparative Example)

100 g of a linear aminopropyl-functional polydimethylsiloxane with an amine content of 2.14 mmol$NH_2$/g (214 mmol $NH_2$) and 5.31 mole-% of iminoalkyl groups was reacted with 60 g water and 10 g 35% aqueous hydrochloric acid (95 mmol HCl, 44 mole-%), but otherwise as in Example 1, to yield after neutralization an aminosiloxane with 4.47 mole-% iminoalkyl content and a $NH_2$-functionality of 1.91.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A composition having a Hazen number of from 0 to 100 and a $H_2N$-functionality of from 1.96 to less than 2.00 comprising:
   (A) at least one aminoalkyl-functional polysiloxane of general formula (I):

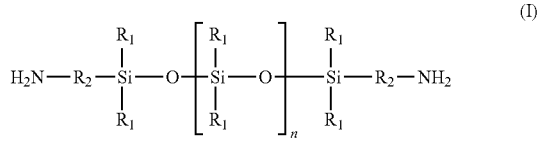

wherein
   $R_1$ is independently selected from the group consisting of a monovalent linear alkyl, branched alkyl, arylalkyl, alkylaryl, and aryl groups containing up to 20 carbon atoms,
   each $R_2$ is independently a linear or branched divalent C3 or C4 alkyl group, and
   n is an integer of from 0 to 7; and
   (B) at least one compound comprising at least one iminoalkyl functional group obtained from the hydrosilylation of at least one olefinic amine and at least one hydridosiloxane in the presence of a platinum catalyst,
wherein the $H_2N$-functionality is determined by $^1H$ NMR using the equation:

$$[H_2N\text{-functionity} = 2.0*(1-[\text{mol \% impurity-CH}]/100,$$

wherein the mole percent impurity-CH functionality is calculated from the corresponding area integral of the impurity (N=CH)-signals of the iminoalkyl groups, observed in the range of from 7.4 to 7.7 ppm versus the integrals of the $SiCH_{n'}$, where n' is 1 or 2 observed in the range of from 0.4 to 0.7 ppm, and wherein the composition is made by a process comprising the steps of:
   (i) reacting a composition having an $H_2N$-functionality of greater than 0 and less than 1.96 and/or color according to Hazen number of greater than 100 comprising at least one an aminoalkyl-functional polysiloxane and at least one compound comprising at least one iminoalkyl functional group with a stoichiometric excess, related to the content of $H_2N$-groups, of an acid with a pKa less than or equal to 5.5 and a stoichiometric excess of water, related to the acid, to provide for a reaction product composition,
   (ii) removing the volatile compounds present in the reaction product composition of step (i) by distillation, optionally with the use of an inert carrier gas, at a temperature of from 40° C. to 250° C. and at a pressure of from 0.1 mbar to 1030 mbar to provide for a devolatilized higher boiling composition,
   (iii) neutralizing the resulting devolatilized higher boiling composition of step (ii) with at least one base to provide for a neutralized and devolatilized higher boiling composition, and
   (iv) depolymerizing the neutralized and devolatilized higher boiling composition of step (iii) in the presence of at least one base to produce a composition containing at least one amino-functional polysiloxane of formula (I), and
   (v) distilling the composition containing at least one amino-functional polysiloxane of step (iv) at a temperature of from 60° C. to 250° C. and at a pressure of from 0.1 mbar to 1030 mbar to provide for the composition comprising components (A) and (B) and having a Hazen number of from 0 to 100 and a $H_2N$-functionality of from 1.96 to less than 2.00.

2. The composition having a Hazen number of from 0 to 100 and a $H_2N$-functionality of from 1.96 to less than 2.00 according to claim 1, wherein the at least one acid of reaction step (i) is hydrochloric acid.

3. The composition having a Hazen number of from 0 to 100 and a $H_2N$-functionality of from 1.96 to less than 2.00 according to claim 1, wherein the base catalyst in step (iv) is sodium hydroxide, potassium hydroxide, cesium hydroxide or their related silanolates.

4. The composition having a Hazen number of from 0 to 100 and a $H_2N$-functionality of from 1.96 to less than 2.00 according to claim 1, wherein the $R_1$ groups are monovalent methyl or phenyl groups.

5. The composition having a Hazen number of from 0 to 100 and a $H_2N$-functionality of from 1.96 to less than 2.00 according to claim 1, wherein the $R_2$ groups are $-CH_2CH_2CH_2-$ or $-CH(CH_3)CH_2-$.

6. The composition having a Hazen number of from 0 to 100 and a $H_2N$-functionality of from 1.96 to less than 2.00 according to claim 1, wherein in process step (i) the aminoalkyl-functional polysiloxane has a color according to Hazen in the range of greater than 100 to 500.

7. The composition having a Hazen number of from 0 to 100 and a $H_2N$-functionality of from 1.96 to less than 2.00 according to claim 1, wherein in process step (i), wherein the excess of water to acid is in a range of from 3 moles of water to acid to 10 moles of water to acid.

8. The composition having a Hazen number of from 0 to 100 and a $H_2N$-functionality of from 1.96 to less than 2.00 according to claim 1, wherein in process step (i), the reaction temperature is controlled between 10-30 degrees Celsius.

9. The composition having a Hazen number of from 0 to 100 and a $H_2N$-functionality of from 1.96 to less than 2.00 according to claim 1, wherein in process step (iv) the base used is the base from step (iii).

* * * * *